B. U. HIESTER.
WELL CASING.
APPLICATION FILED JAN. 5, 1911.
1,001,523.
Patented Aug. 22, 1911.
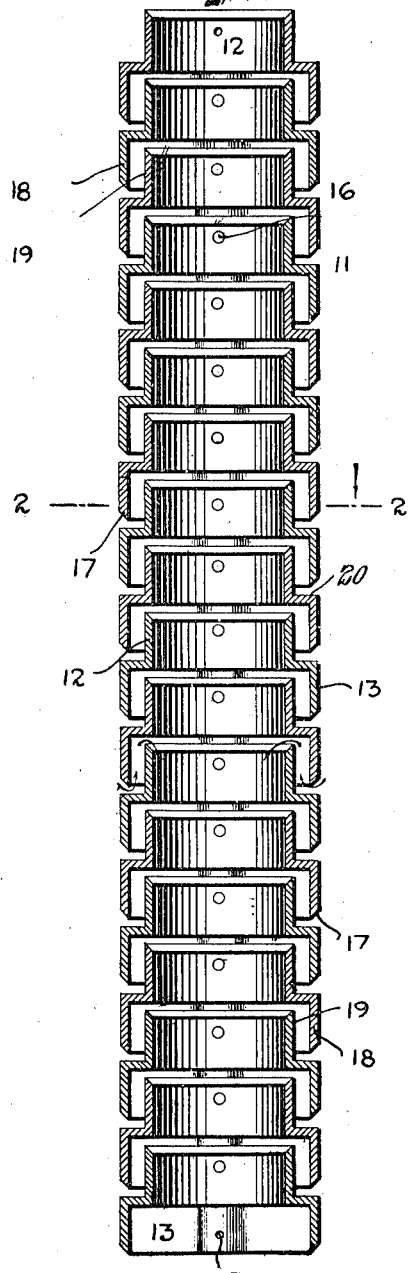
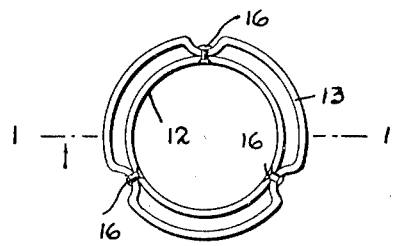
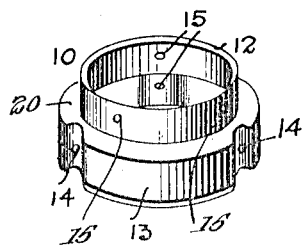
WITNESSES
INVENTOR
Barent U. Hiester
BY
ATTORNEYS

UNITED STATES PATENT OFFICE.

BARENT U. HIESTER, OF GRAND RIDGE, ILLINOIS.

WELL-CASING.

1,001,523.  Specification of Letters Patent.  Patented Aug. 22, 1911.

Application filed January 5, 1911. Serial No. 600,919.

*To all whom it may concern:*

Be it known that I, BARENT U. HIESTER, a citizen of the United States, and a resident of Grand Ridge, in the county of Lasalle and State of Illinois, have invented a new and Improved Well-Casing, of which the following is a full, clear, and exact description.

An object of the invention is to provide a device for constituting a well in oil fields and irriguous lands. For the purpose mentioned use is made of a plurality of connected shells forming a casing and having walls of different diameters, the said shells being connected to form an opening therebetween for the admission of fluid to the interior of the casing.

In most well casings, a cylindrical member is provided, having therein a number of holes for the admission of fluid to the interior of the casing. These casings, however, admit sand and gravel even though the openings are made very small and furthermore the said openings soon become clogged, thus preventing the fluid from entering the casing. In my device, the fluid, in order to enter the well, moves upwardly between connected shells and enters the well at a higher level while all particles of sand and the like, due to their weight, are prevented from moving upwardly between the shells and gaining admittance to the well.

Reference is to be had to the accompanying drawings, constituting a part of this specification, in which similar characters of reference denote corresponding parts in all the views and in which—

Figure 1 is a longitudinal sectional view of my well casing taken on the line 1—1 in Fig. 2; Fig. 2 is a sectional view taken on the line 2—2 in Fig. 1 and Fig. 3 is a perspective view of a shell forming a part of my casing.

Referring more particularly to the views, I provide a plurality of connected shells 10 forming a casing 11. Each of the shells 10 is provided with integral walls 12 and 13 of which the walls 13 are of a larger diameter than the walls 12 as will be readily seen by referring to Figs. 2 and 3. In the sides of the walls 13 suitable indentations 14 are formed for connecting the wall 13 to the wall 12 of the next adjacent shell, suitable rivet holes 15 being provided in the walls 12 and 13 for the reception of rivets 16. To secure the casing 11 the smaller wall 12 of each shell 10 is connected to the larger wall 13 of the next following shell, the lower periphery of the wall 13 being remote from the transversely extending portion 20, and in this manner a casing of any desired length can be constructed; it is to be noted that by securing the lower portion of the wall 13 away from the portion 20, a means of communication to the interior of the casing is provided. The edges 17 of the walls 13 are preferably beveled to disclose a larger entrance for the admission of a fluid.

When the casing is disposed in the ground the fluid draining thereto moves upwardly between the inner side 18 of the wall 13 and the outer side 19 of the wall 12 and in this manner is received in the casing at a higher level. All sand and the like being heavy, tends to drop downwardly exteriorly of the casing and thus does not enter the same.

It will be readily seen that the shells forming my casing can be connected in any suitable manner and it will be understood that the scope of the invention is defined in the appended claims.

Having thus described my invention, I claim as new, and desire to secure by Letters Patent:

1. A well casing comprising a plurality of connected shells, each shell comprising an inner and an outer wall, the outer wall of each shell being remote from the outer wall of the next adjacent shell, and the inner wall of each shell lying between the outer wall of an adjacent shell and the interior of the casing.

2. A well casing unit in the form of a shell comprising an inner closed wall and an outer closed wall, the said walls being concentric, the lower end of the inner wall and the upper end of the outer wall being connected together, the said outer wall being provided with indented portions extending within the unit a suitable distance whereby the said outer wall is adapted to be placed over the inner wall of an adjacent unit, the ends of the said indented portions being in contact with the said inner wall.

3. A well casing comprising a plurality of connected shells, each shell being made up of an outer wall portion and an inner wall portion, with a part of the shell connecting the said walls, the outer wall of each shell being provided with indentations, the inner ends of which are in engagement with the inner wall of an adjacent shell, and means engaging adjacent shells at the indented portion of one of them, the outer wall of one shell being remote from the outer wall of an adjacent shell, whereby a means of communication from the exterior of the casing to the interior thereof is provided.

4. A well casing made up of a plurality of similar connected shells, each shell comprising an outer wall portion and an inner wall portion, the outer wall portion being of a greater diameter than the inner wall portion, and means for holding the outer wall portion of one shell connected to the inner wall portion of an adjacent shell, the outer wall portions of the said shells being remote from each other, whereby communication may be had from the exterior of the casing to the interior thereof.

5. A well casing comprising a plurality of similar circular connected shells, each shell being made up of an outer wall portion and an inner wall portion, the said wall portions being of different diameters and the height of each wall portion being approximately one-half the height of the shell with a portion thereof connecting the said wall portions, and means for engaging the outer wall portion of one shell with the inner wall portion of an adjacent shell, the outer wall portions of the said shells being remote from each other.

6. A well casing made up of a plurality of circular shells, of substantially identical formation, and connected together, each shell consisting of an outer wall portion and an inner wall portion of different diameters, the said wall portions being connected together, each outer wall portion being indented, and the diameter of the circle on which the inner ends of the said indentations lie being substantially equal to the diameter of the inner wall portion, whereby when the outer wall portion of one shell is brought into engagement with the inner wall of an adjacent shell and connected thereto, a means of communication from the exterior of the casing to the interior thereof is provided.

7. A well casing unit in the form of a shell comprising an inner closed wall, an outer closed wall, the adjacent ends of the said walls being connected together, the said inner wall being provided with a number of holes, the said outer wall being provided with a number of indentations, each of the said indentations being provided with a hole, the said indentations extending within the said outer wall to a suitable distance whereby when the said outer wall is placed in a position to inclose the inner wall of an adjacent unit the said indentations will abut the said inner wall and the holes in the said indentations and the said inner wall will register whereby certain means may be passed therethrough in order to hold the units together.

In testimony whereof I have signed this specification in the presence of two subscribing witnesses.

BARENT U. HIESTER.

Witnesses:
JAMES P. CATLIN,
DENNIS J. O'MARA.